June 18, 1940.                R. T. GILLETTE                2,205,251
                            RESISTANCE LINE WELDING
                              Filed July 21, 1938
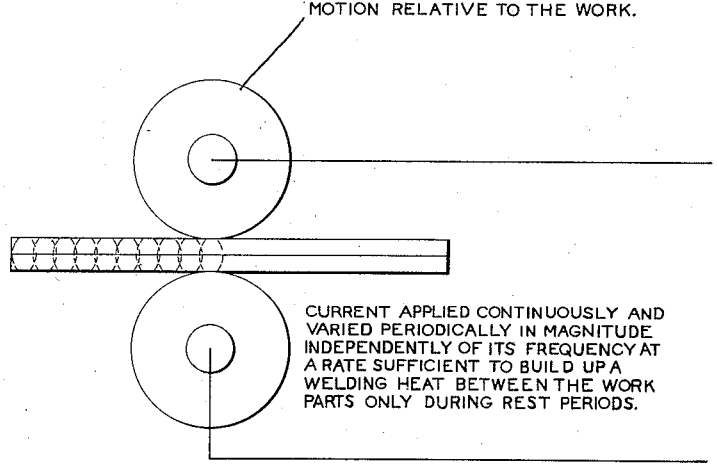
Inventor:
Robert T. Gillette,
by Harry E. Dunham
His Attorney.

Patented June 18, 1940

2,205,251

UNITED STATES PATENT OFFICE 2,205,251

RESISTANCE LINE WELDING

Robert T. Gillette, Scotia, N. Y., assignor to General Electric Company, a corporation of New York Application July 21, 1938, Serial No. 220,526

4 Claims. (Cl. 219—10)

My invention relates to resistance seam or line welding.

In resistance line welding, the parts to be welded are subjected to pressure and current applied by electrodes which engage the work and at least one of which moves relatively thereto and makes a rolling engagement therewith along the line of welding.

In performing resistance line welding operations, it is difficult to secure a satisfactory weld without burning, pitting, or grooving the surface or surfaces of the work parts that make engagement with the electrode or electrodes moved relatively thereto. This is due primarily to excessive surface temperatures resulting from the current densities which occur at the point of engagement of the electrode with the work. For example, the usual roller electrode makes essentially a line contact with the work, and the heating current must pass through this restricted area while the weld is being made between the work parts over a much greater area.

These difficulties have been eliminated when resistance line welding thin metal parts by rapidly making and breaking the welding circuit to interrupt periodically the flow of welding current. Instead of making and breaking the current the same results may be obtained by periodically decreasing the welding current to a low value.

This procedure has not proved effective, however, when welding thick metal parts, for example, one-eighth of an inch or more in thickness. To weld parts of such thicknesses greater pressures and current values must be used, yet the effective area of contact between an electrode and the work remains essentially the same as when welding thin metal parts. If current values sufficient for welding the thick metal parts are employed the surface or surfaces thereof in engagement with the electrode or electrodes frequently become molten, and during welding this molten metal is blown out from between the electrode or electrodes and the parts being welded, thus producing burned depressions which badly deface the outer surface of the work parts. If the surface in contact with the electrode is not raised to a molten condition it is, nevertheless, rendered very plastic so that under the extreme pressures employed the electrode sinks into the work and produces a deep groove, not only disfiguring the work surface but greatly reducing the strength of the resulting weld.

It is an object of my invention to provide an improved procedure for resistance line welding thick metal parts without objectionably defacing the surfaces thereof in engagement with the electrode used in performing the welding operation.

Further objects of my invention will become apparent from the following description thereof.

In accordance with my invention thick metal parts may be resistance line welded without objectionable surface deformation or disfigurement if the electrode and the work are traversed relative to one another with an intermittent or step-by-step movement while continuously supplying heating current which is periodically varied in magnitude at a rate such that a welding heat is built up between the work parts only during periods of rest in the above referred to intermittent or step-by-step movement.

In the drawing I have diagrammatically illustrated my invention by indicating one form of welding machine in which the work parts are fed between two roller electrodes which are employed for supplying welding pressure and current thereto. By appropriate legends appearing on the drawing it is pointed out that at least one of these electrodes is rotated intermittently to produce a step-by-step linear motion between the work parts and electrodes whose engaging surfaces are brought into successive contact with one another and that current is applied continuously to these electrodes and varied periodically in magnitude independently of its frequency at a rate sufficient to build up a welding heat between the work parts only during rest periods. As also illustrated in the drawing, the step-by-step movement of the electrodes relative to the work parts is preferably such that the welds produced during rest periods overlap one another to form a continuous line weld.

Any line welding machine provided with a control for supplying an interrupted flow of current, such as has been heretofore used when welding thin metal parts, may readily be converted into a machine suitable for performing my method of welding thick metal parts by providing therein means for causing a step-by-step linear motion between the work parts to be welded and at least one of the cooperating electrodes by means of which the interrupted flow of current is applied thereto. This step-by-step linear motion may be secured in many ways. I have obtained it by periodically energizing and deenergizing the motor by means of which the work parts and electrodes are moved relative to one another. A transmission suitable for obtaining this intermittent travel with a constant speed motor may also be employed. The transmission may, for example, embody a Geneva movement or a reciprocating ratchet drive. Such ratchet drives have heretofore been employed in resistance line welding machines to obtain a step-by-step feeding movement between electrodes and the work, and the drive may be such as that illustrated in United States Letters Patent No. 1,310,070—Henry Geisonhöner, July 15, 1919, or No. 1,438,867—Edmund Schröder, December 12, 1922.

In such a machine, when practicing my invention, the periodically interrupted flow of welding current is of insufficient magnitude to produce a weld while the electrode is moving relative to the work parts but of sufficient magnitude to produce a weld during those periods of rest when no relative movement occurs between the work parts and the electrode. Furthermore, the frequency of interruption of the welding current is adjusted so that during rest periods the welding heat is built up slowly within an interval of time during which several decreases or interruptions in the flow of welding current occur. The relative adjustment between step-by-step movement of the work parts relative to the electrode and the frequency of current interruption will depend upon the thickness of the parts being welded as well as the current densities that may be employed without burning or causing surface deformation between the work parts and the electrode. The best procedure for any application can only be determined by experiment, keeping in mind the underlying factors above described.

For performing my procedure, it is desirable to provide adequate cooling of the electrode or electrodes and the work. Water-cooled electrodes may be employed alone or in conjunction with streams of water applied to the work where the electrodes make engagement therewith.

The periodically interrupted flow of welding current may be obtained in many ways either through mechanical switches or suitably controlled electric valves such as are suitable for controlling the flow of welding current in resistance spot and line welding machines. Instead of reducing the current to zero by such controls and thus completely interrupting the flow of welding current, it is to be understood that the flow of heating current may be partially interrupted; that is, periodically varied between a real value and a greater value. This interruption or variation may be obtained by periodically increasing and decreasing the impedance of the welding circuit, by the use of a modulating device, by combining two sources of supply of slightly different frequency to obtain a resultant beat frequency of low periodicity, or by using a low frequency source of supply. Other arrangements will occur to those skilled in the art.

Either direct or alternating current may be used in performing the welding operation. When alternating current is used, it is to be understood that the periodic interruptions or variations in the flow of welding current occur at a rate which is independent of the frequency of the source unless the frequency is so low as to in itself constitute such interruptions or variations; that is, the welding current flows for a number of cycles and is then interrupted or greatly reduced for a number of cycles in succession during a welding operation.

What I claim as new and desire to secure by Letters Patent of the United States, is:

1. The method of resistance line welding which comprises applying a welding pressure to the work through an electrode which makes a rolling engagement therewith, producing alternating periods of rest and bodily movement between said electrode and the work so that their engaging surfaces are in successive contact with one another along a line of welding, applying continuously to said electrode and the work heating current insufficient in magnitude to produce a weld during said periods of movement but sufficient to produce a weld during said periods of rest, and periodically interrupting the flow of said current at a rate such that a plurality of interruptions occur during each of said rest periods.

2. The method of resistance line welding which comprises applying a welding pressure to the work parts through a roller electrode, causing intermittent relative bodily movement between the work parts and said electrode to produce a step-by-step rolling engagement therebetween, and gradually producing a welding heat in the work parts during rest periods in the intermittent relative movement between the work parts and said electrode by applying continuously to said electrode and the work parts alternating current the flow of which is interrupted periodically independently of its frequency at a rate such that a plurality of interruptions occur during each of said rest periods.

3. The method of resistance line welding which comprises applying a welding pressure to the work parts through an electrode which makes a rolling engagement therewith, causing intermittent relative movement between the work parts and said electrode to apply the working surface of said electrode in successive contact with a surface of the work parts along a desired line of welding, and applying continuously to said electrode and the work parts heating current which periodically varies in magnitude independently of its frequency at a rate sufficient gradually to build up a welding heat between the work parts only during the intervals that said electrode and the work parts remain stationary relative to one another.

4. The method of resistance line welding which comprises applying a welding pressure to the work through an electrode which makes a rolling engagement therewith, producing alternate periods of rest and bodily movement between said electrode and the work so that their engaging surfaces are in successive contact with one another along a line of welding, and applying continuously to said electrode and the work a heating current which varies periodically at a rate such that a plurality of variations occur during each rest period in the alternate periods of rest and bodily movement between the work and said electrode, said heating current being insufficient to produce a weld during said periods of movement but sufficient to produce a weld during said periods of rest.

ROBERT T. GILLETTE.